Jan. 2, 1968     C. P. DAVIS     3,360,924
FLYWHEEL
Filed Feb. 4, 1966     3 Sheets-Sheet 1
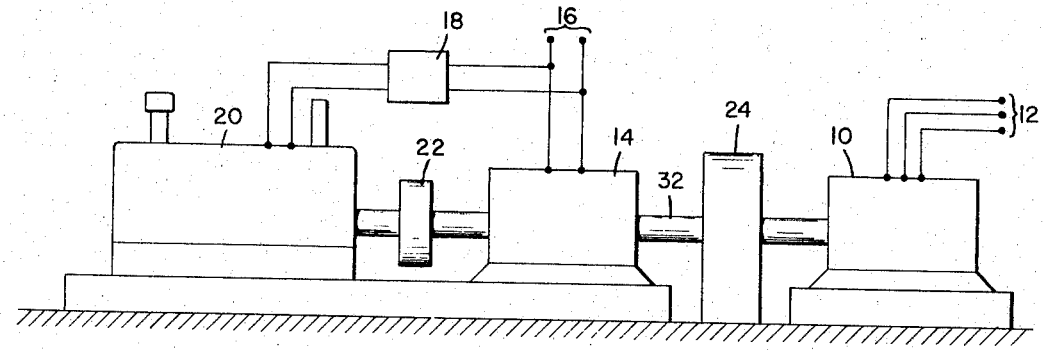
FIG_1
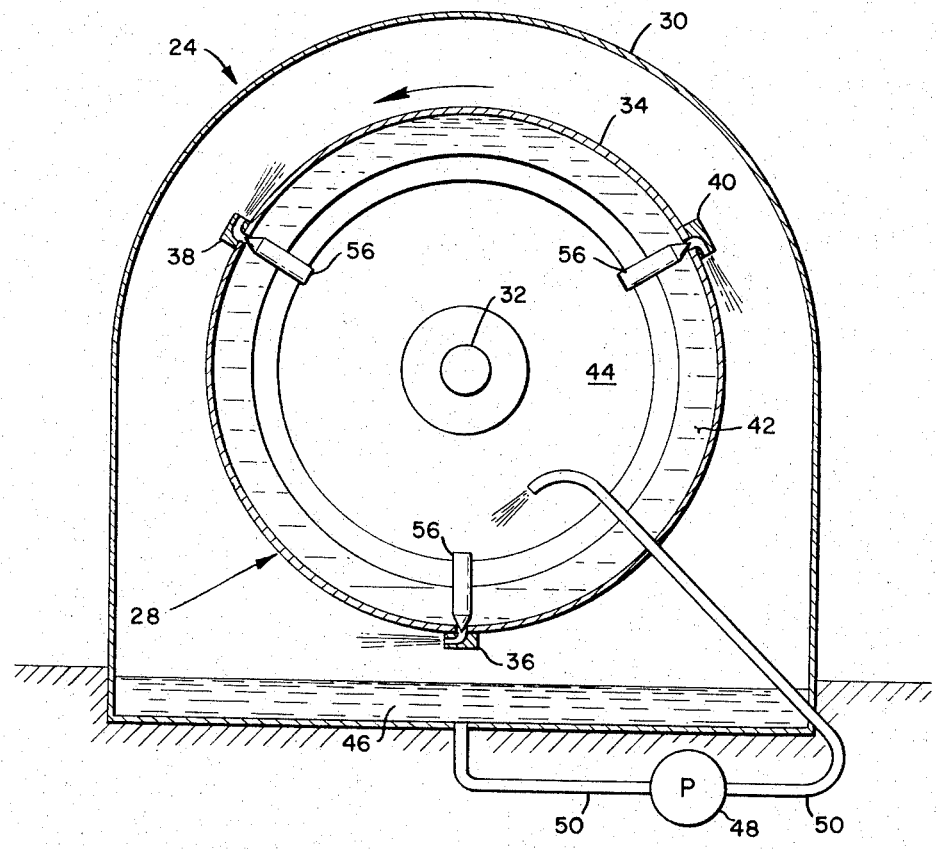
FIG_2
INVENTOR
CHARLES P. DAVIS
BY
*Mellin, Moore & Weissenberger*
ATTORNEYS

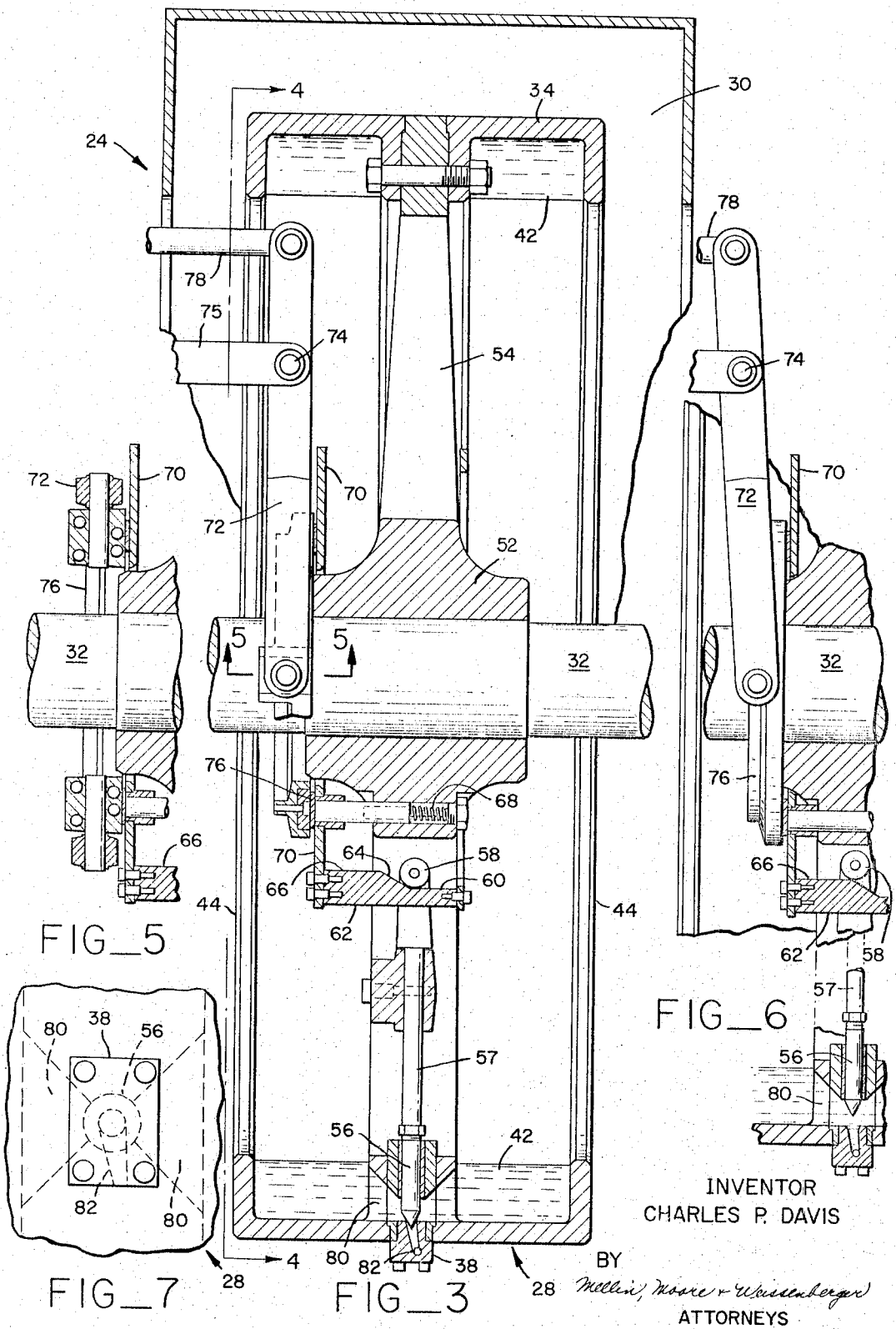

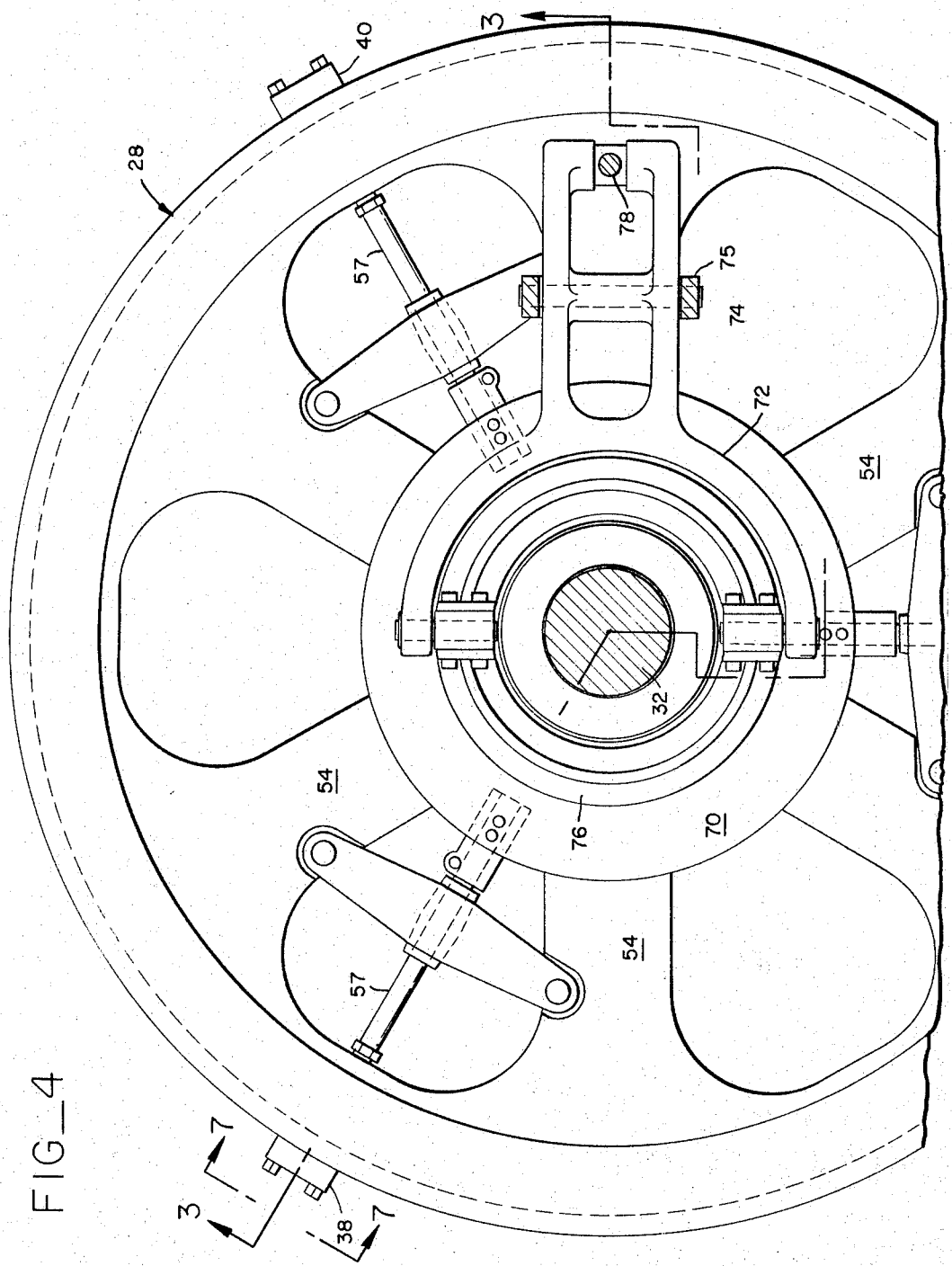
Jan. 2, 1968  C. P. DAVIS  3,360,924
FLYWHEEL
Filed Feb. 4, 1966  3 Sheets-Sheet 3
FIG_4
INVENTOR
CHARLES P. DAVIS
BY
Mellin, Moore + Weissenberger
ATTORNEYS

United States Patent Office 3,360,924
Patented Jan. 2, 1968

3,360,924
FLYWHEEL
Charles P. Davis, San Luis Obispo, Calif., assignor to Technical Materiel Corporation, Mamaroneck, N.Y., a corporation of New York
Filed Feb. 4, 1966, Ser. No. 525,051
6 Claims. (Cl. 60—1)

ABSTRACT OF THE DISCLOSURE

This refillable hydraulic flywheel has a radially inwardly open trough-shaped rim in which water is centrifugally contained under pressure, and from which it can be tangentially discharged through valved conduits controlled by a servo-operable linkage to provide emergency drive power to the wheel as needed. The open rim allows refilling of the trough without stopping the wheel.

---

This invention relates to hydraulic flywheels, and more particularly to a constant-speed flywheel which is so constructed that it is capable, for a limited time, of driving machinery without any external power supply at an exactly constant velocity regardless of load variations.

In some electromechanical applications such as high-powered radio transmitting equipment, electromechanically produced power of very constant frequency has to be supplied at extremely high power levels. For example, in such equipment, the radio-frequency power may be provided by a very rapidly rotating alternator which is driven, under normal conditions, by an electric motor. An auxiliary source of power, such as an internal combustion engine, is routinely provided for such installations in the event that the primary power should fail. However, it will be readily understood that in the event of a power failure, the internal combustion engine requires a small but finite length of time to start and get up to speed. During this time, the alternator velocity is at best materially reduced, and the resultant variation in the frequency of the radio-frequency signal can become extremely troublesome.

For this reason, a flywheel is customarily provided between the motor and alternator so as to keep the alternator speed at least within tolerable limits during the transition to auxiliary power. However, in sophisticated installations even this is insufficient, and the need for a device which is capable of maintaining the alternator velocity exactly constant during the transition has arisen.

A first proposal in this direction was made in United States Patent No. 3,014,341, in which it was proposed to fill a hollow flywheel with water and then to overcome the deceleration of the system during the shift by pushing the water stored in the flywheel out through a turbine arrangement which utilized its kinetic energy to provide extra power until all the water had been pushed out. The system of Patent No. 3,014,341, however, still had some disadvantages. For one, it required substantial power to expel the water; secondly, it was not possible to accurately control the outflow of water from the flywheel, and consequently overcontrol resulted when the load on the alternator was slight; thirdly, the system, once used, could not be used a second time without stopping the flywheel and refilling it; and fourthly, its axially lateral discharge failed to use the kinetic energy of the fluid with maximum efficiency.

The present invention overcomes these problems by providing a hydraulic flywheel in which the fluid is discharged at maximum radius; in which the fluid discharge rate can be accurately controlled by low-power servo-mechanisms to provide precisely the correct amount of extra power necessary during the period of operation; to maintain the rotational velocity constant; and in which it is possible to immediately refill the flywheel following an operation without stopping it, so that the apparatus is almost instantly restored to readiness for a subsequent operation.

It is, therefore, an object of this invention to provide a hydraulic flywheel having means to continuously regulate the water discharge therefrom.

It is another object of this invention to provide a hydraulic flywheel which is refillable while in motion.

It is still another object of this invention to provide a hydraulic flywheel of the type described in which the control power is limited to that necessary to operate a valve.

It is still a further object of the invention to provide a hydraulic flywheel of maximum efficiency.

These and other objects of this invention will become apparent from the following specification, taken in connection with the attached drawings in which:

FIG. 1 is a schematic diagram of an installation in which the present invention is useful;

FIG. 2 is a schematic diagram illustrating the principle of operation of the present invention;

FIG. 3 is a vertical section of an embodiment of this invention along line 3—3 of FIG. 4;

FIG. 4 is a vertical section along line 4—4 of FIG. 3;

FIG. 5 is a retail section of the actuating yoke along line 5—5 of FIG. 4 in its rest position;

FIG. 6 is a view similar to FIG. 5 but showing the yoke in its active position; and FIG. 7 is an enlarged plan view of a nozzle as indicated by line 7—7 on FIG. 4.

Basically, the invention relates to a constant-speed flywheel consisting generally of a wheel whose rim has a cross section in the shape of an inverted U. This flywheel can be used either in a one-shot operation or, with the aid of the second aspect of the invention referred to hereafter, in a repeatable operation. In the operation of the wheel, water is pumped into the U-shaped rim and is forced thereagainst under great pressure due to the centrifugal force resulting from the rapid rotation of the wheel. A valve mechanism is provided in the spokes of the wheel which, when opened, permits the water stored in the wheel to be discharged outwardly of the wheel through nozzles arranged tangentially thereto. The reaction due to the high velocity water stream exiting from these nozzles provides a substantial force which drives the wheel until the water supply in the rim is exhausted.

In accordance with a second aspect of the invention, the water discharged from the wheel is collected in an outer, stationary enclosure, in which it runs to the bottom and can be pumped back into the wheel upon restoration of the external drive power by appropriate pumping apparatus.

Referring now to the drawings, FIG. 1 shows a typical arrangement in which the present invention has utility. FIG. 1 shows an alternator 10 which may be adapted, for example, to deliver radio-frequency power at the output 12. Under normal circumstances the alternator 10 is driven by an electric motor 14 which receives its power from the ordinary power line 16. Also connected to the power line 16 is a control apparatus 18 which is arranged to start the internal combustion engine 20 whenever the power in the line 16 fails. A clutch 22 is provided between the engine 20 and the motor 14. The clutch 22 is so arranged as to engage the engine 20 with the motor-and-alternator set 14, 10 whenever the engine 20 is running at the atppropriate speed. In order to prevent the alternator 10 from slowing down during a transition from electric network power to auxiliary power, a flywheel unit 24 according to this invention is installed upon the drive shaft of alternator 10.

As will be seen schematically in FIG. 2, the flywheel unit 24 consists of a wheel member, generally shown as 28, and an outer housing generally designated as 30. The wheel member 28 is mounted on the drive shaft 32 of alternator 10 and has a rim 34 which has three radial apertures connecting with L-shaped nozzle members 36, 38, 40. The rim 34 is generally U-shaped in cross section and, when the flywheel is operating, is filled with water 42 which is prevented from running out the open sides 44 of the wheel 28 by the fact that the centrifugal force of the rotation of wheel 28 presses it against the outside of the rim 34.

As will be described more in detail hereinafter with respect to FIGS. 3 and 4, the openings in the rim 34 are provided with valves 56 which can be opened and closed as desired. When these valves 56 are opened, water will be discharged from the nozzles 36, 38, 40 under considerable pressure as generally indicated in FIG. 2. In a practical application of the type described herein, these pressures due to the angular momentum of the water mass 42 can typically be on the order of 4000 lbs. per square inch, and it is practical to provide a water mass sufficient to produce driving times on the order of twenty seconds with a 200 kw. load.

The reaction upon the nozzles 36, 38, 40 resulting from the exit of water therefrom under such pressure provides a considerable driving force which tends to drive the wheel in the direction in which it is normally turning, so as to offset any loss of speed due to the removal of the normal driving force provided by the motor 14. Since the kinetic energy stored in the water mass 42 is a function of radius, the discharge at the point of maximum radius will be seen to provide optimum utilization of the capabilities of the system.

The water discharged into the housing 30 collects in its bottom as at 46 and can then be pumped by an appropriate pump 48 and a conduit 50 back into the rim 34 through the open side 44 of the wheel 28 as soon as some external driving force is again available. The external power source is, of course, needed upon refilling to provide the energy which is stored in the spinning water mass as kinetic energy.

Referring now more particularly to FIGS. 3 and 4, the shaft of a typical embodiment of the invention is again shown at 32. The rim 34 is held on the hub 52 by spoke members 54. The nozzles such as 36 are normally closed by a valve member 56 which is pressed against its seat by the centrifugal force generated by the rotation of the wheel 28. The valve pull rod 57 is provided with a roller follower 58 which normally rests against the surface 60 of the same 62. However, if the cam 62 is moved toward the right in FIG. 3, the roller follower 58 rides up against the inclined surface 64 of cam 62 and finally onto its upper surface 66 (see FIG. 6). It will be seen that during its travel along the inclined surface 64, the roller follower 58 gradually draws the valve 56 out of engagement with its seat and permits more and more water to escape from the rim 34 into the nozzle 36.

It follows that in the system of this invention, the control mechanism need only have sufficient power to overcome the centrifugal force holding the valve against its seat and to accelerate the valve to its opening velocity. No displacement of the water itself by the control mechanism is necessary.

The cam 62 is normally biased into its left-most position in FIG. 3 by a spring 68. Its rightward movement against the bias of spring 68 is effected by pushing to the right the ring 70 which connects all three of the cams 62 (one for each of the nozzles 36, 38, 40). This motion of ring 70 is in turn effected by pivoting the yoke 72 about its pivot 74 in a counterclockwise direction in FIG. 3 until its shoe 76 (which is preferably made of a lubricous material such as graphite) engages the ring 70 and pushes it to the right upon further pivotal movement of the yoke 72. The pivot 74 is fixedly supported by an appropriate supporting structure 75.

The yoke 72 can be pivoted by a lateral motion (in FIG. 3) of the actuator bar 78 which may be connected to an appropriate servomechanism (not shown). The latter can be, in turn, controlled in accordance with the velocity of rotation of the alternator 10, or in any other desired manner. Such a servomechanism may, for example, be a governor mechanism which is independent of any external source of power.

As will be best seen from FIGS. 3 and 5, the nozzle 36 has a water inlet 80 which is normally closed off by the valve 56. The throat 82 of the nozzle curves from a direction normal to the rim into a direction tangential to it through an arc of gradually diminishing cross section which is so calculated as to prevent cavitation under the influence of the increasing speed of the water as it travels through the throat 82 of the nozzle.

As best shown in FIG. 7, the axis of the nozzle at its exit end may be at a slight angle to the plane of the wheel 28 so as to throw the water out at an acute angle to the plane of the wheel rather than exactly tangential to the rim. This results in a slight loss of efficiency, but this slight loss is amply compensated for by avoiding impact of the expelled water stream against the next succeeding nozzle and thus preventing the much greater loss of efficiency which would be caused thereby.

It will be readily seen that the device of this invention has utility in a number of applications, and that the embodiment shown herein may be readily modified both as to the manner of control and as to its other features as a particular application may require. Consequently, I do not desire to be limited by the embodiment shown and described herein, but only by the scope of the following claims.

I claim:

1. A hydraulic flywheel comprising: a wheel having a fluid-retaining rim; discharge means for discharging fluid retained in said rim tangentially thereto; and valve means for controlling the discharge of fluid from said discharge means.

2. The device of claim 1, further comprising a housing for collecting the discharged fluid, and means for returning the collected fluid into said fluid-retaining rim.

3. The device of claim 1, in which said discharge means are arranged to discharge said fluid at an acute angle to the plane of said wheel.

4. The device of claim 1, in which said discharge means include an opening in said rim; and said valve means include an element adapted to vary the effective size of said opening, and control means for operating said element to selectively control the rate of fluid discharge through said opening.

5. The device of claim 4, in which said control means include a valve actuating mechanism attached to said element and comprising cam means on said flywheel movable axially of said flywheel and actuable to operate said element in accordance with the axial movement of said cam means; and normally stationary means engageable with said cam means to impart controlled axial movement to said cam means.

6. The device of claim 5, in which said cam means comprise an axially movable ring coaxial with said flywheel; and said stationary means comprise an axially movable member coaxial with said flywheel and slidably engageable with said ring, and means for axially moving said member.

No references cited.

EDGAR W. GEOGHEGAN, *Primary Examiner.*